(12) United States Patent
Wu et al.

(10) Patent No.: US 8,322,636 B2
(45) Date of Patent: Dec. 4, 2012

(54) PRODUCTION OF MULTILAYERED THIN FILM PARTICLES

(75) Inventors: Songtao Wu, Ann Arbor, MI (US);
Hongfei Jia, Ann Arbor, MI (US);
Debasish Banerjee, Ann Arbor, MI (US); Minjuan Zhang, Ann Arbor, MI (US); Masahiko Ishii, Okazaki (JP)

(73) Assignees: Toyota Motor Engineering & Manufacturing North America, Inc., Erlanger, KY (US); Toyota Motor Corporation, Toyota (JP)

(*) Notice: Subject to any disclaimer, the term of this patent is extended or adjusted under 35 U.S.C. 154(b) by 188 days.

(21) Appl. No.: 12/968,570

(22) Filed: Dec. 15, 2010

(65) Prior Publication Data

US 2012/0153056 A1    Jun. 21, 2012

(51) Int. Cl.
*B02C 21/00* (2006.01)

(52) U.S. Cl. ............................. 241/3; 241/21; 241/22
(58) Field of Classification Search ............... 241/3, 21, 241/22, 30, 169.2
See application file for complete search history.

(56) References Cited

U.S. PATENT DOCUMENTS

| | | | |
|---|---|---|---|
| 2,402,167 A | 6/1946 | Lang | |
| 2,465,167 A | 10/1949 | Rintelman | |
| 3,657,248 A | 4/1972 | Wagener | |
| 6,902,807 B1 * | 6/2005 | Argoitia et al. | 428/403 |

* cited by examiner

*Primary Examiner* — Faye Francis
(74) *Attorney, Agent, or Firm* — Gifford, Krass, Sprinkle, Anderson & Citkowski, P.C.

(57) ABSTRACT

A process for producing particles from a thin film is provided. The process includes grinding the thin film using granules that afford for the particles to maintain a structure and/or one or more properties of the thin film. In addition, the process provides for a high recovery percentage of the source material.

13 Claims, 1 Drawing Sheet

PRODUCTION OF MULTILAYERED THIN FILM PARTICLES

FIELD OF THE INVENTION

The present invention is related to a process for producing particles, and in particular to a process for producing particles that have a multilayered structure.

BACKGROUND OF THE INVENTION

The production of particles, powders, and the like is common. Typical production processes include the use of gas atomization, ball mills, precipitation from sol-gel processes, and the like. However, in some instances, the manufacture of particles from a thin film is desired. For example, thin films having a multilayered structure can be useful in particle form. In addition, thin films having a multilayered structure can be relatively delicate to handle with crushing and/or conventional grinding of such material resulting in damaging and/or destruction of the multilayered structure. Therefore, a process for producing particles from a thin film having a multilayered structure that maintains the multilayered structure and provides high recovery of the source material would be desirable.

SUMMARY OF THE INVENTION

A process for producing particles from a thin film having a multilayered structure while maintaining the multilayered structure of the film is provided. In some instances, the process further includes the ability to recover a high percentage of the source material, that is the thin film, in the form of the particles.

The process can include providing a substrate and then producing a thin film having a multilayered structure on the substrate. Thereafter, the thin film is removed intact from the substrate, the thin film having a first hardness. Granules having a second hardness that is less than the first hardness are provided. In addition, the granules are completely soluble in a rinsing liquid.

The intact thin film is ground into particles using the granules with the particles retaining the multilayered structure of the thin film. After the particles are produced, the particles and the granules are rinsed with the rinsing liquid, the granules dissolving in the rinsing liquid and leaving the particles to be recovered. In some instances, over 70% of the thin film in the form of the particles is recovered, while in other instances, over 80% of the thin film is recovered. In still yet other instances, over 85% of the thin film in the form of particles is recovered.

The thin film can be any thin film from which particles are desired, for example a thin film that is an omnidirectional structural color. The omnidirectional structural color can have a multilayered structure made from a plurality of oxide layers, a plurality of polymer layers, or a combination thereof.

The granules can be made from a salt, a polymer, and/or a biomass. For example and for illustrative purposes only, the granules can be a salt and the rinsing liquid can be water. In the alternative, the granules can be a polymer such as nylon, Teflon®, polyurethane, and the like. In addition, the granules in the form of biomass can be made from wood, sugarcane, sorghum, willow, poplar, corn, hemp, switchgrass, and/or miscanthus.

The particles may or may not be in the form of flakes that have a top and/or bottom surface and a thickness. The top and/or bottom surface can have a length and a width, and the flakes can have a top surface width to thickness ratio of greater than 5. In some instances, the flakes can have a top surface width to thickness ratio of greater than 10, while in other instances the flakes can have a top surface width to thickness ratio of greater than 20.

DETAILED DESCRIPTION OF THE PRESENT INVENTION

The present invention provides a process for producing particles from a thin film while maintaining desired properties of the thin film and affording high recovery of the source material, that is the thin film. As such, the present invention has utility as a process for producing particles.

The process can include providing a thin film and providing granules that have complete solubility in a rinsing liquid. The thin film can have a first hardness and the granules can have a second hardness which may or may not be less than the first hardness. The granules are also completely soluble in a rinsing liquid. The thin film is subjected to grinding using the granules for a predetermined amount of time and/or until a desired particle size is obtained. Thereafter, the particles and the granules are rinsed with the rinsing liquid, the result being the granules dissolving and being rinsed or flushed away while leaving the particles to be recovered.

In some instances, the process can further include providing a substrate and producing the thin film on the substrate, followed by removal of the thin film intact from the substrate. This intact thin film is then taken and subjected to the grinding using the granules as stated above. The process affords for over 70% of the source material, that is the thin film, to be recovered in the form of the particles. In some instances, over 80% of the source material is recovered in the form of particles, while in still other instances over 85% of the source material is recovered.

The thin film can be any thin film known to those skilled in the art and may or may not have a multilayered structure. For example and for illustrative purposes only, the thin film can be an omnidirectional structural color made from a plurality of oxide layers, a plurality of polymer layers, combinations thereof, and the like.

The granules can be selected from any suitable material that has a hardness that is less than the thin film, for example and for illustrative purposes only, a salt, a polymer, a biomass, combinations thereof, and the like. For example, the granules can be a salt and the rinsing liquid can be water, a polymer such as nylon, Teflon®, polyurethane, etc., a biomass such as miscanthus, switchgrass, hemp, corn, poplar, willow, sorghum, sugarcane, one of a variety of different types of wood, etc., and/or combinations thereof.

The process can produce particles that are in the form of flakes that have a top surface and/or a bottom surface and a thickness. The top surface can have a length and a width, and the flakes can have a top surface width to thickness ratio greater than 5, greater than 10 and/or greater than 20.

Figure 1:
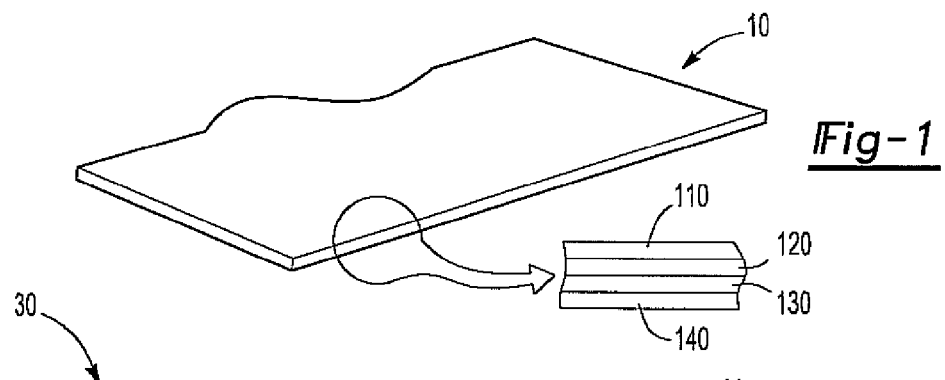
FIG. 1 is a schematic illustration of a thin film having a multilayered structure.

Turning now to FIG. 1, a schematic illustration of a thin film having a multilayered structure is shown generally at reference numeral 10, the thin film 10 having a plurality of layers 110, 120, 130, 140, and the like. The multilayered structure can be produced and/or used for any number of reasons, applications, etc., for example and for illustrative purposes only, as an omnidirectional structural color. The thin film can be made by any method or process known to those skilled in the art, illustratively including sputtering, plasma vacuum deposition, sol-gel processing, layer-by-layer processing, and the like. In some instances, the multilayered structure can be delicate in the sense that the structure and/or one or more property of the thin film 10 needs to be maintained after the film has been broken up or crushed into particles. Stated differently, it is desirable and/or critical that the structure and/or one or more properties of the thin film 10 is maintained by the particles.

Figure 2:
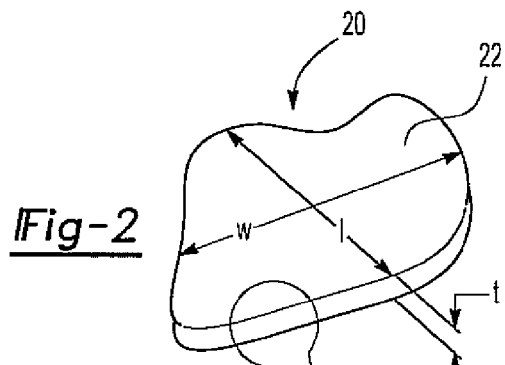
FIG. 2 is a schematic illustration of a particle in the form of a flake having a multilayered structure.

For example, a particle in the form of a flake 20 that has maintained the multilayers 110, 120, 130, 140 of the thin film 10 is illustratively shown in FIG. 2. In this manner, the particle 20 can provide similar and/or identical properties as the thin film 10. For example and for illustrative purposes only, if the thin film 10 is an omnidirectional structural color, then the particle 20 can exhibit similar and/or identical reflection properties as the thin film 10. As observed in FIG. 2, the particle can have a top surface 22 that has a length and a width 'w'. For the purposes of the present invention, the length is defined as the longest physical dimension across the top surface 22 and the width is defined as the widest physical dimension along the length of the top surface 22 with the width dimension taken orthogonal to the direction or measurement of the length dimension. The particle 20 also has a thickness 't'.

The process affords for the production of particles from the thin film 10 such that the multilayered structure 110, 120, 130, 140 is maintained by a plurality of particles 20. In addition, the particles 20 can maintain or provide a desired top surface 22 dimension to thickness t ratio. For example, the particle 20 can have a top surface width w to thickness t ratio of greater than 5. In the alternative, the particle 20 can have a top surface width to thickness ratio of greater than 10, and in some instances greater than 20.

Figure 3:
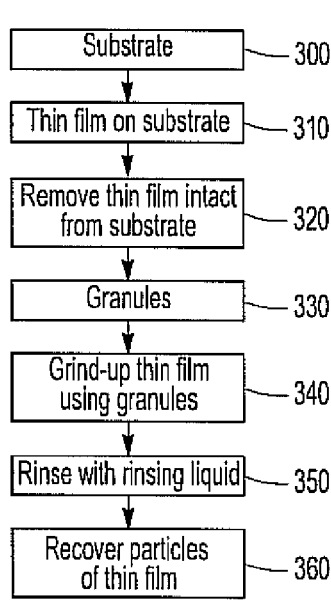
FIG. 3 is a schematic diagram illustrating a process according to an embodiment of the present invention.

Turning now to FIG. 3, a schematic diagram of a process according to an embodiment of the present invention is shown generally at reference numeral 30. The process includes providing a substrate at step 300 and producing a thin film on the substrate at step 310. At step 320, the thin film is removed intact from the substrate and granules are provided at step 330. It is appreciated that the process can include simply providing a thin film to be ground using the granules and steps 300-320 are not required.

The thin film is ground up using the granules which produces particles at step 340 and the particles and granules are rinsed with a rinsing liquid that is provided at step 350. As stated above, the granules are completely soluble within the rinsing liquid and, as such, rinsing of the particles and granules with the rinsing liquid at step 350 results in the granules dissolving and being washed or flushed away. As such, the particles can be recovered at step 360.

In order to better illustrate and/or teach the present invention, an example of a process for grinding a thin film and producing particles in the form of flakes is provided below.

EXAMPLE

Multilayered structural colored films made from titania, silica, and hafnia were produced on a substrate and subsequently removed from the substrate intact. Sodium chloride salt was purchased from Sigma-Aldrich Chemical Company (St. Louis, Mo.). A given thin film was placed in an agate mortar along with the addition of sodium chloride salt powder. Approximately 20 weight percent salt and 80 weight percent thin film were placed in the agate mortar. The thin film and salt were ground using an agate pestle and after 8 to 12 minutes of grinding, distilled water was added into the mortar and the solution was poured into a series of stacked stainless steel sieves. Salt was removed from the sieves by adding or flushing distilled water therethrough three times. Sizing of the particles was controlled using the stacked sieves, which from top to bottom had cutoff sizes/pores of 50, 30, 20 and 15 microns. And finally, the particles were collected, transferred to separate glass vials and then used to determine the amount of material recovered, for scanning electron microscopy (SEM) analysis, and the like. In addition, particles obtained by direct grinding of multilayered structural colored films without the addition of salt were produced and served as control samples.

Figure 4A:
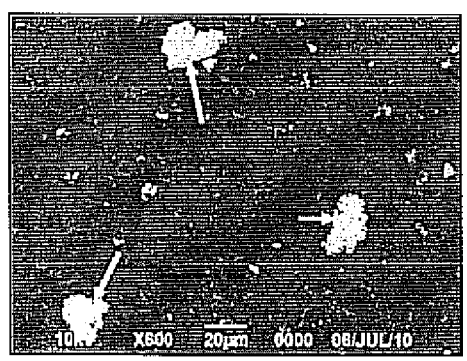
FIG. 4 is a comparison of scanning electron microscopy images for particles made from a thin film having a multilayered structure produced from: (A) a conventional process; and (B) a process according to an embodiment of the present invention.
Figure 4B:
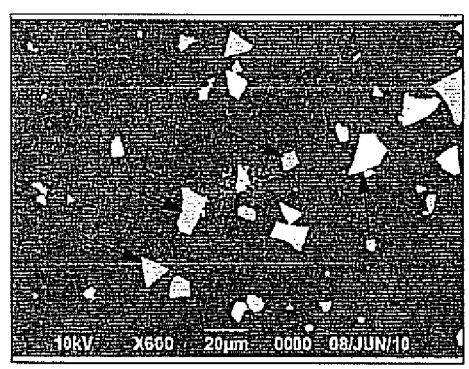

Turning now to FIG. 4, two SEM images are provided for particles produced without the addition of salt (FIG. 4A) and particles produced with the addition of salt (FIG. 4B). As shown in FIG. 4A, the particles highlighted by the arrows in the image exhibited severe degradation when compared to the particles shown in FIG. 4B and did not possess any omnidirectional structural color properties. In contrast, the particles shown in FIG. 4B, that is the particles produced using the addition of salt, had a flake appearance and in fact still possessed the multilayered structure that was present within the original thin film. Furthermore, and although not the subject of the present invention, the particles when mixed with a binder provided a paint having omnidirectional structural color properties.

Figure 5:
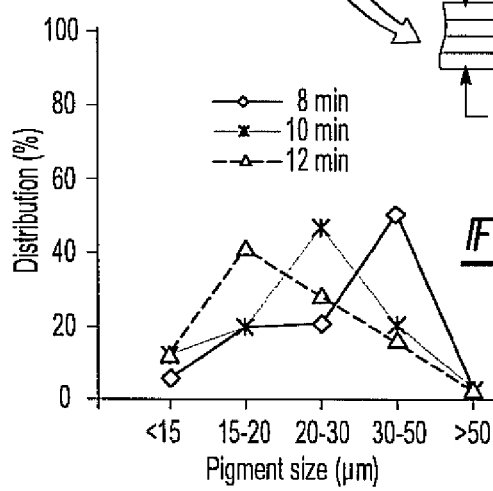
FIG. 5 is a graph illustrating the effect of grinding time on particle size distribution.

The effect of grinding time on particle size distribution is shown in the graph of FIG. 5. Total yields of the particles in the size range between 15 to 50 microns were approximately 90% with the size distribution shifting to smaller sizes with longer grinding time. As such, the control of size distribution can be attained by simply adjusting the grinding time.

In view of the teaching presented herein, it is to be understood that numerous modifications and variations of the present invention will be readily apparent to those of skill in the art. For example, while the invention has primarily been described with reference to thin films having multilayered structures, the present invention can also be used with thin films having a single layered structure but in which particles in the form of flakes are desired and/or particles having the same properties as the thin film are desired. As such, the foregoing is illustrative of specific embodiments of the invention, but is not meant to be a limitation upon the practice thereof. It is the following claims, including all equivalents, which define the scope of the invention.

We claim:

1. A process for producing particles from a thin film having a multilayered structure while maintaining the multilayered structure of the film and providing a high recovery rate of the particles, the process comprising:
   providing a substrate;
   producing a thin film having a multilayered structure on the substrate;
   removing the thin film intact from the substrate, the thin film having a first hardness;
   providing granules having a second hardness less than the first hardness, the granules being completely soluble in a rinsing liquid;

grinding the intact thin film into particles using the granules, the particles retaining the multilayered structure of the thin film; and rinsing the particles and the granules in the rinsing liquid, the granules dissolving in the rinsing liquid and leaving the particles to be recovered.

2. The process of claim 1, wherein over 70% of the thin film is recovered in the form of the particles.

3. The process of claim 2, wherein over 80% of the thin film is recovered in the form of the particles.

4. The process of claim 3, wherein over 85% of the thin film is recovered in the form of the particles.

5. The process of claim 1, wherein the thin film is an omnidirectional structural color multilayered structure.

6. The process of claim 5, wherein the omnidirectional structural color multilayered structure is a plurality of oxide layers.

7. The process of claim 6, wherein the omnidirectional structural color multilayered structure is a plurality of polymer layers.

8. The process of claim 1, wherein the granules are selected from a group consisting of a salt, a polymer and a biomass.

9. The process of claim 8, wherein the granules are a salt and the rinsing liquid is water.

10. The process of claim 8, wherein the biomass is selected from a group consisting of miscanthus, switchgrass, hemp, corn, poplar, willow, sorghum, sugarcane and wood.

11. The process of claim 1, wherein the particles are in the form of flakes having a top surface and a thickness, the top surface having a length and a width, and the flakes having a top surface width to thickness ratio greater than 5.

12. The process of claim 11, wherein the flakes have a top surface width to thickness ratio of greater than 10.

13. The process of claim 12, wherein the flakes have a top surface width to thickness ratio of greater than 20.

* * * * *

UNITED STATES PATENT AND TRADEMARK OFFICE
CERTIFICATE OF CORRECTION

PATENT NO. : 8,322,636 B2
APPLICATION NO. : 12/968570
DATED : December 4, 2012
INVENTOR(S) : Songtao Wu Page 1 of 1

It is certified that error appears in the above-identified patent and that said Letters Patent is hereby corrected as shown below:

On the Title Page:

(56) References Cited, delete "2,465,167", insert --2,485,167--

In the Specification:

Column 3, line number 28, after "length" insert --'l'--

Signed and Sealed this
Eleventh Day of November, 2014

Michelle K. Lee
*Deputy Director of the United States Patent and Trademark Office*